United States Patent [19]
Raillère et al.

[11] 3,860,345
[45] Jan. 14, 1975

[54] METHOD AND APPARATUS FOR TESTING FOR PHOSPHOR PARTICLES CONTAINED IN THE ATMOSPHERE

[75] Inventors: Raymond Raillère; Georges Edouard Fulachier, both of Vert Le Petit, France

[73] Assignee: Etat Francais, Paris, France

[22] Filed: Nov. 16, 1973

[21] Appl. No.: 416,629

Related U.S. Application Data
[63] Continuation-in-part of Ser. No. 269,404, July 6, 1972, Pat. No. 3,807,863.

[30] Foreign Application Priority Data
Dec. 21, 1972 France .............................. 72.45572

[52] U.S. Cl................... 356/87, 356/187, 431/4, 431/126
[51] Int. Cl. ............................................. G01j 3/30
[58] Field of Search ........... 356/87, 187; 431/4, 126

[56] References Cited
UNITED STATES PATENTS
| | | | |
|---|---|---|---|
| 3,213,747 | 10/1965 | van der Smissen | 367/87 X |
| 3,486,827 | 12/1969 | Binek et al. | 356/87 X |
| 3,644,743 | 2/1972 | Binek et al. | 356/87 X |
| 3,807,863 | 4/1974 | Raillère et al. | 356/87 |

Primary Examiner—Ronald L. Wibert
Assistant Examiner—F. L. Evans
Attorney, Agent, or Firm—Waters, Roditi, Schwartz & Nissen

[57] ABSTRACT

A method and apparatus for detecting products contained in the atmosphere in which ambient air is fed to a primary burner mounted in an enclosure. Hydrogen is also supplied to the primary burner in excess of the stoichiometric amount for conversion of the oxygen in the air to water and the hydrogen is burned to produce a flame. A secondary burner surrounds the first burner for burning hydrogen excess contained in the exhaust gases from the primary burner. The flame of the primary burner is optically analyzed to detect the magnitude of phosphor products in the ambient air supplied to the primary burner.

13 Claims, 3 Drawing Figures

METHOD AND APPARATUS FOR TESTING FOR PHOSPHOR PARTICLES CONTAINED IN THE ATMOSPHERE

CROSS-RELATED APPLICATION

This application is a continuation-in-part of our co-pending application Ser. No. 269,404, filed July 6, 1972 and issued as U.S. Pat. No. 3,807,863 on Apr. 30, 1974.

BACKGROUND

A. Field of the Invention

The present invention relates to a method and apparatus for the detection of various by-products contained in the atmosphere.

B. Prior Art

Numerous phosphor by-products have been found to be very toxic. Therefore, industries in which such by-products are produced must employ means for permanently detecting, anywhere and in a very dependable manner, the existence of by-products of this type in the atmosphere. Available phosphor detectors have not proven fully reliable and satisfactory.

SUMMARY OF THE INVENTION

An object of the invention is to provide a detector for phosphor and other various by-products contained in the atmosphere which is very reliable, highly sensitive, preferably self-contained and portable. The detector allows for either continuous or discontinuous detection and can be easily associated with a suitable alarm device, either external or a part of the apparatus.

The apparatus utilizes a process, whose principle is known, i.e., flame emission. Within the scope of this process, however, the following specific features have been selected:

use of a phosphor emission at a 526 mu wave length by the implementation of a double flame device, as a primary burner, the use of relative quantities of oxygen and hydrogen which result in a richer hydrogen mixture compared to the stoichiometric quantities required for the production of water.

The apparatus, according to this invention, comprises:

a primary hydrogen flame burner including a center hot air inlet connected with the atmosphere to be tested, and a controlled hydrogen annular inlet. The air is sucked into the apparatus due to the pressure of a controlled suction which is maintained within said apparatus by an adjustable flow fan and a capillary tube which causes a pressure drop in the air inlet. The air is heated by conveying it through a pipe incorporated in the body of the apparatus and by circulating the air over a suitably heated filter. The hydrogen is supplied from a pressurized cylinder and a fine adjustment of the hydrogen flow can be obtained by the utilization of a capillary tube fitted in the gas line.

a second burner, mounted directly above the first, is used for burning the excess hydrogen contained in the exhaust gases delivered by the primary burner flame. For this purpose, the second burner directly opens into a chamber which is fed with combustion gas from the primary burner gases, on the one hand, and with combustion air through openings provided in the body of the apparatus, and through which the ambient air is admitted as a result of the suction existing within the body of the apparatus.

an adjustable flow fan providing a suitable and controllable negative pressure or suction in the body of the apparatus.

means for ensuring gas ingition in the burners, and a device for analyzing the light radiation of the primary burner flame. This device essentially consists of a heat resisting glass window located in the body of the apparatus at the level of the flame an interference filter tuned to a wave length corresponding to the element to be detected and a photomultiplier or other suitable device for converting the light signal into an electrical signal.

The apparatus, according to this invention, may also be supplemented with the following additional elements:

a measuring device or amplifier-recorder for the measurement of the by-product concentrations to be detected, a conventional alarm device adapted to be actuated by the presence of an electrical signal of predetermined magnitude from the photomultiplier, an alarm correction or cancellation device which may, for instance, include a second photomultiplier, connected with the same burner, but receiving the light signal through an interference filter tuned to a wave length such that:

it corresponds to a pre-visible spurious radiation it refers to another emission of the product and which is used as a confirmation, e.g., phosphor at 560 m$\mu$.

The invention is further directed to an air supply device for the first burner including means for diverting aspirated air to be analyzed to the first burner for detection of gaseous products in the atmosphere.

An essential condition to the good operation of the apparatus is the stability of the flame and the minimization of the effect of ambient atmospheric conditions outside of the apparatus, notably that of wind and the present invention provides for such stabilization.

The present invention also has the advantage of providing an exact composition of the ambient air by analyzing the diverted portion.

The apparatus according to the invention can therefore be utilized under the conditions as frequently found in the ambient air, for example, for the study of atmospheric pollution. It is easily adapted to the detection of all substances which provoke a specific luminous emission when burned in the flame, by using an interference filter adapted to each of these substances.

The present invention further comprises means for diverting a portion of aspirated air, the diverted portion being analyzed in the burner. The means for diverting the portion of aspirated air comprises a main conduit having an air inlet and directly connected to a suction fan, a first branch line extending from said main conduit to the first burner via a capillary tube, a second branch line extending from said main conduit downstream of the first branch line to the body to establish negative pressure within the enclosure, and control means in said main conduit between said branch lines for diverting the portion of the inlet air to said capillary tube and first burner; the control means can comprise a regulable calibrated restriction in said main conduit.

By the above arrangement aspirated air in the main conduits flows at a rate substantially greater than that necessary to supply the first burner, and a portion of this strong flow is diverted to the burner, said portion representing the quantity of air necessary for the feeding of the burner. This quantity is substantially less than the quantity of aspirated air and represents a minor portion thereof. There is obtained a feed of air to the burners at a stable and continuous rate. This intense aspiration is obtained, for example, by a pump of centrifugal type or a helical blower. A pump of membrane, paddle or piston type creating a reciprocatory discharge is incompatible with a regular and continuous feed of the burners. Pumps of centrifugal type and helical blowers require little energy and they are well adapted for use in a portable apparatus.

The calibrated restriction in the main conduit can be constituted, for example, by a rotatable vane or by a control orifice of regulable size.

The invention also relates to a method which is characterized in that the analysis is effected in a double flame burner and the primary burner is supplied with hydrogen and ambient air in a mixture whose relative proportion of hydrogen is greater than that corresponding to the stoichiometric production of water.

DETAILED DESCRIPTION

Figure 1:
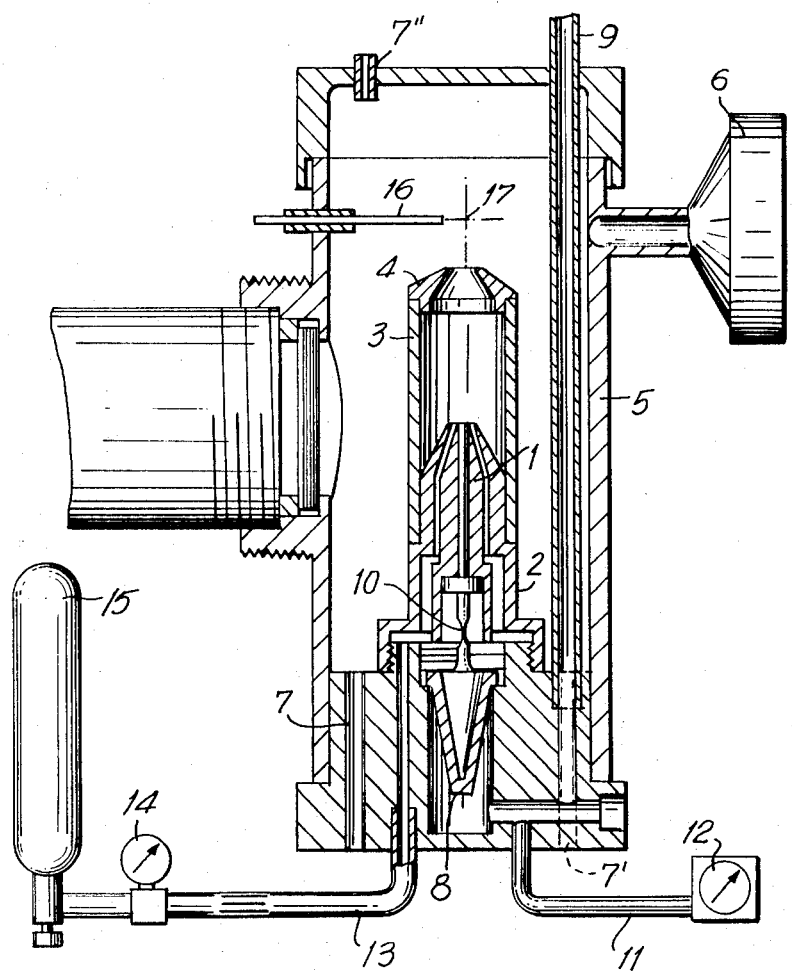
FIG. 1 is a cross-sectional view of the apparatus and the burners.

Referring to FIG. 1, the apparatus comprises a first burner comprising two concentric nozzles, i.e., an inner nozzle 1 having an inlet for ambient air to be examined for the presence of phosphor particles therein, and an outer nozzle 2. The nozzles 1 and 2 are mounted within an enclosure formed by a rigid metal body 5.

Hydrogen is introduced through an annular space between nozzles 1 and 2. The nozzles are covered with a glass tube 3 on which is mounted a third nozzle 4 serving as a second burner for burning excess hydrogen. Ambient air is sucked into the nozzle by the development of a negative pressure within body 5 under the action of an adjustable flow fan 6. The fan 6 is preferably a centrifugal pump or a helical blower which produces constant suction at relatively low power. As a result of the negative pressure or suction, a certain quantity of auxiliary air is introduced through various openings 7, 7' and 7'' located in the burner body. This air is required for burning the excess hydrogen.

The air entering the nozzle 1 flows through metal filter 8 which is heated by thermal conductivity of the nozzle support block of body 5. The air itself is preheated after circulating in air inlet tube 9 provided inside the burner body.

This arrangement makes it possible to retain the solid particles normally contained in the air, these being liable to generate a spurious emission, caused for example by the emission of very bright sodium lines or by incandescence upon passage through the flame. On the other hand, the heating allows recovery in vapor formed of the phosphor products of mean volatility whose detection is desired.

A capillary tube 10 with a restriction therein allows the differential pressure between the inside and outside of the body to be increased, thus facilitating the measurement and adjustment of the air flow across the nozzle through simple indication of the suction upstream of the capillary tube by means of pressure conduit 11 and pressure gauge 12.

The establishment of the hydrogen flow is performed by measuring the inlet pressure. This measurement can take place by inserting a second capillary tube 13 into the body. A pressure gauge 14 installed between the pressure reducing valve of a supply cylinder 15 and the capillary tube allows this flow to be measured after calibration.

In the embodiment described, ignition is achieved at the flame level of nozzle 4 via a high-voltage spark generated either by a transformer or a coil similar to that of an automobile engine.

The spark is initiated between electrode 16 and tip 17 connected to ground.

In other embodiments, ignition may be effected by means of a wire placed over nozzle 4, the wire being made red hot by the passage of an electric current therethrough.

The burner body construction is such that it is substantially light impermeable although it incorporates large auxiliary air inlets.

Figure 2:
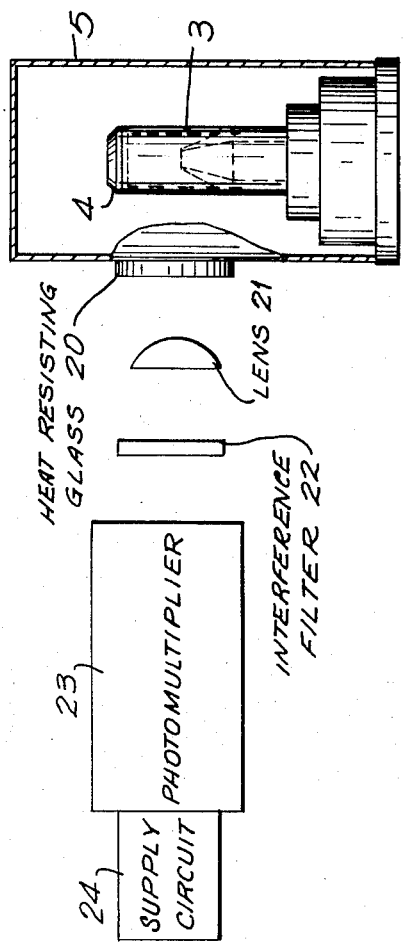
FIG. 2 is a schematic diagram of an optical-electric device associated with the apparatus.

An optical receiver, schematically shown in FIG. 2, is placed at right angles to the flame axis at a distance of a few millimeters from the nozzle outlet.

The optical receiver comprises a heat resisting glass 20 to stop or to reflect infrared rays; a lens 21 having a focal length such that it receives the widest possible solid angle of aperture and transmits a substantially parallel beam; an interference filter 22 tuned to the main emission wave length of the phosphor particles, i.e., 526 m$\mu$; a photomultiplier 23 having 10 stages and a photocathode diameter sufficient to pick-up the entire beam from lens 21 which is transmitted through filter 22; and a supply circuit 24 for the photomultiplier fed with high voltage from an inverter, the latter being supplied with low voltage from a primary battery or a storage battery. The usable signal is taken across the anode of the photomultiplier and the positive terminal connected to the HV-power supply ground. This signal is then transmitted either to a direct reading instrument or recorder, or to an amplifier controlling a visual or audio warning system.

The device described above has been used to determine the optimum operating conditions allowing the highest sensitivity to be obtained.

As a result it has been found that the maximum signal is obtained when the hydrogen and air proportions correspond to the theoretical quantities for producing $H_2O$. In this case, however, the usable signal-to-flame lower ratio is far from reaching its maximum value. To attain the latter, it is necessary to decrease the air flow so as not to exceed the optimum value which is dependent upon the size of the inlet nozzle.

As a reference, not to be considered as limitative, it has been found that with a 2 mm dia. air inlet nozzle, the air flow affording the highest signal-to-flame bottom ratio ranges approximately from 60 to 70 $cm^3$/minute.

This ratio shows a very large drop on either side of this value.

On the other hand, the hydrogen flow does not entail any noticeable effect, provided however that it is at least higher than that corresponding to the production of $H_2O$.

Figure 3:
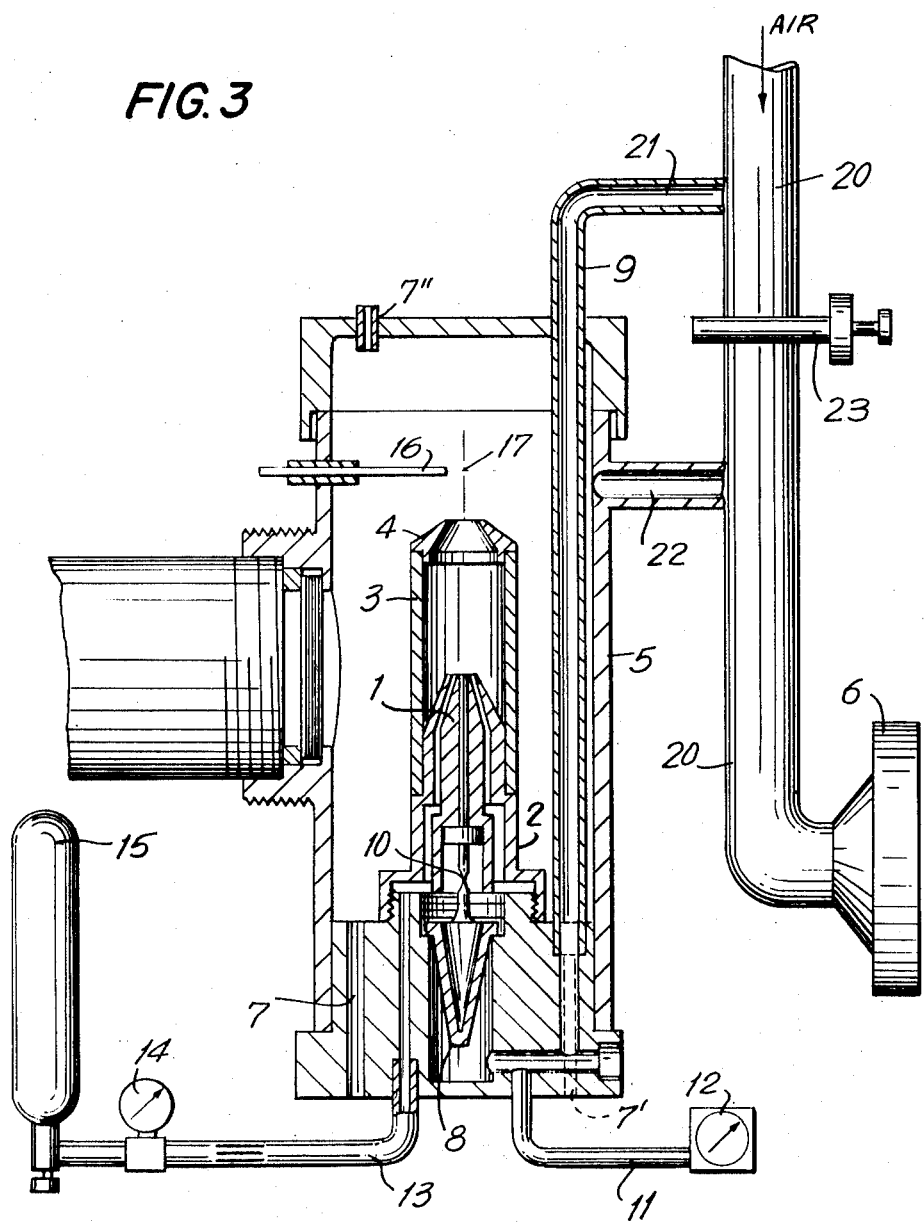
FIG. 3 is a similar view of a modified embodiment.

Consequently, particular care must be taken to ensure a constant air flow, after its setting, either by using a high precision fan or by incorporating a flow regulator such as a metering orifice in the supply conduit. FIG. 3 shows a specific arrangement therefor and will be discussed later.

Finally, it is important that the auxiliary air inlets 7, 7' and 7'' be effected as little as possible by environmental conditions. (e.g., wind).

To this end, the location of these air inlets is widely diversified, each being separately protected against direct external effects. Furthermore, to minimize the latter, the amount of air flowing through these inlets must be much higher (e.g., 20 to 50 times) than that flowing through the nozzle.

In some cases, it may be advantageous to bleed the air from the nozzle by means of a pick-off provided in the large airflow of one of these auxiliary inlets.

As the system operates on the exhaust mode, the flows at each inlet are easily adjustable using a single fan, thus precluding the risk of modifying the concentration after the passage in the moving elements of a pump.

Referring next to FIG. 3, which is similar to FIG. 1 and wherein the same reference numerals are used to designate the same elements, the distinction therein lies in the manner of air supply to the first and second burners. In particular, the first burner should be fed at a rate of about 0.1 liters of air per minute taking into consideration the necessity of limiting the consumption of hydrogen. To achieve steady and stable flow at such low rate, ambient air is aspirated, initially, in a conduit 20 by the fan 6. At two spaced locations along conduit 20 there are formed branch lines 21 and 22, branch line 21 being an inlet conduit leading to the first burner and branch line 22 being a discharge conduit extending from the second burner. The diameter of conduit 20 is about 10 mm. The diameter of the inlet line 21 to the first burner must be less than conduit 20, since the flow of air to the first burner must be much less than the total flow of air in the conduit 20. In the particular embodiment, the fan 6 produces a flow in conduit 20 of 30 liters/minute in the absence of any obstructions in conduit 20. A control element 23 is placed in conduit 20 between the connection thereto of branch lines 21 and 22, the control element being regulatable to adjust the relative air flow in conduit 20 and in branch lines 21 and 22. The control element 23 permits lowering of the air flow in conduit 20 to 10 liters/minute, this corresponding to air supply to the first burner at a rate of 0.1 liters/minute. Hence, the control element 23 serves to accurately control the rate of feed of air to the first burner by diverting a measured portion of a high rate of air flow to fan 6, this being effective to provide flame stability and continuity. The control element 23 can be constructed as a conventional controllable calibrated orifice or as a vane.

The control element 23 produces a suction downstream thereof in conduit 20, and this suction has the effect of diminishing the flow of air in the conduit 20 in proportion to the restriction by element 23 to divert continuously the necessary quantity of air to be analyzed to the first burner. The diverted air utilized is therefore a representation of a volume of air, surrounding the aspiration orifice, which is much greater than that corresponding to the aspiration of a single quantity of air necessary for the burners. The average concentration of the air in the vicinity of the apparatus is therefore much better determined in the apparatus of the invention as compared to apparatus which only draws in the very small amount of air necessary to feed the burners. Also, the effect of local ambient conditions is virtually negligible.

In order to adapt the apparatus for the detection of elements having characteristic bands in the emission spectrum of the flame, it is suitable to replace the interference filter 22 at the first burner by an interference filter for a different characteristic emission wave length. The interference filter can be tuned to an emission wave length of 396 m$\mu$ for sulfur, 589 m$\mu$ for sodium, 516.6 m$\mu$ for carbon and 451 m$\mu$ for indium.

The method described allows the following performance to be achieved:

if the test seeks indication of the concentration in the absence of contaminating agents other than the product to be detected, i.e., if the sole background noise limiting the sensitivity results from flame fluctuations and from photomultiplier background noise, the $PH_3$ product (or phosphor compound equivalent) or other measured product can be detected with a concentration of 0.5 ppb (parts per billion)

if the test aims at a detection in the presence of certain contaminating agents differing from the phosphor products or other product to be measured, the $PH_3$ product (or phosphor compound equivalent) or other measured product can be detected with a correct specificity using a concentration of 20 ppb (parts per billion).

The apparatus can be easily carried and therefore is portable as the required power supplies can be delivered by a primary battery or a storage battery. By way of reference, a 24-V battery, with a current draw of 1 A, has been used for supplying the various components as follows:

| | |
|---|---|
| Exhaust fan | 0.2 A |
| HV-inverter | 0.1 A |
| Spark ignition | 0.2 A |
| Amplifier or recorder | 0.3 A |
| Total | 0.8 A |

What is claimed is:

1. Apparatus for detecting products contained in the atmosphere, said apparatus comprising
    a rigid body defining an enclosure,
    suction means for producing a negative pressure within said enclosure,
    a primary burner means mounted in said enclosure,
    means for supplying hydrogen to said primary burner means,
    air supply means for supplying ambient air to said primary burner means, said air supply means including a capillary tube between the ambient air and the primary burner means,
    a secondary burner means surrounding said primary burner means for receiving and burning hydrogen excess contained in the exhaust gases from said primary burner means, said body having openings therein for flow of air into the enclosure under the negative pressure therein, to supply air to the secondary burner means,
    means for igniting the gases in the burner means,
    means for optically analyzing the flame of the primary burner means to detect the magnitude of selected by-products in the ambient air supply to the primary burner means, and said air supply means including a main conduit having an air inlet and directly connected to said suction means, a first branch line extending from said main conduit towards said capillary tube, a second branch line extending from said main conduit downstream of the first branch line to said body to establish the negative pressure within the enclosure, and control means in said main conduit between said branch lines for diverting a portion of the inlet air to said capillary tube and first burner means.

2. Apparatus as claimed in claim 1 wherein said means for supplying hydrogen to said primary burner means comprises means for regulating the supply of hydrogen so that it is in excess of the amount which would be necessary to produce water with the oxygen in the air supplied to the primary burner means.

3. Apparatus as claimed in claim 1 wherein said primary burner means comprises first and second nozzles and said secondary burner means comprises a third nozzle on and coaxial with said first and second nozzles.

4. Apparatus as claimed in claim 3 wherein said first and second nozzles define an annular passageway through which hydrogen gas is passed, said first nozzle having an axial duct with an inlet for flow of ambient air therethrough.

5. Apparatus as claimed in claim 4 comprising means for heating the ambient air within said body before the air is fed to the inlet of the first nozzle.

6. Apparatus as claimed in claim 1 wherein said means for optically analyzing the flame comprises an interference filter facing said primary burner means to be exposed to the flame produced thereby and pass light of a selected wave length, and means for receiving the light passed by the interference filter to indicate the intensity of such light.

7. Apparatus as claimed in claim 6 wherein the means for receiving the light comprises a photomultiplier for converting the light energy into electrical energy.

8. Apparatus as claimed in claim 1 wherein said control means comprises means for providing a regulable calibrated restriction in said main conduit.

9. A method for detecting products contained in the atmosphere, said method comprising forming an enclosure, producing a negative pressure within said enclosure, supplying hydrogen to a first burner in said enclosure, supplying ambient air to said first burner via a capillary tube, regulating the supply of hydrogen to the first burner so that it is in excess of the amount which would be necessary to produce water with the oxygen in the air supplied to the first burner, burning the hydrogen in the first burner to produce a flame, burning, in a second burner in the enclosure, excess hydrogen contained in the exhaust gases from said first burner, supplying air to said second burner under the action of the negative pressure in said enclosure and optically analyzing the flame produced in the first burner to detect the magnitude of selected products in the ambient air supplied to the first burner, said ambient air being supplied to the first burner by establishing a strong flow of ambient air in a main conduit, diverting a minor portion of the air flow in said conduit to the capillary tube via a branch line, suctioning the interior of the enclosure by connecting the same to said main conduit at a location downstream of said branch line, the magnitude of the portion of air flow diverted to said capillary tube being controlled by providing a calibrated restriction in said main conduit between the branch lines.

10. A method as claimed in claim 9 comprising heating the ambient air within said enclosure before the air is fed to the inlet of the first burner.

11. A method as claimed in claim 9 wherein said flame is optically analyzed by an interference filtering of the light of said flame to pass light energy of a selected wave length receiving the light energy which is passed, and indicating the intensity of such light energy.

12. A method as claimed in claim 11 comprising converting the light energy to electrical energy, the magnitude of the latter being a measure of the intensity of the light energy.

13. A method as claimed in claim 9 comprising constructing the calibrated restriction to be adjustable.

* * * * *